May 31, 1966 P. W. SCHAFF 3,253,833

RECORD CHANGER

Original Filed March 14, 1962 2 Sheets-Sheet 1

May 31, 1966 P. W. SCHAFF 3,253,833

RECORD CHANGER

Original Filed March 14, 1962 2 Sheets-Sheet 2

United States Patent Office 3,253,833
Patented May 31, 1966

3,253,833
RECORD CHANGER
Paul W. Schaff, Arlington Heights, Ill., assignor to Warwick Electronics Inc., a corporation of Delaware
Original application Mar. 14, 1962, Ser. No. 179,680, now Patent No. 3,218,079, dated Nov. 16, 1965. Divided and this application Mar. 20, 1964, Ser. No. 353,455
8 Claims. (Cl. 274—10)

This invention relates to a record changer with a record balancer and, more particularly, to a record balancer which aids to prevent unnecessary wear or damage to the records.

This application is a division of application Serial No. 179,680 of Paul W. Schaff, filed March 14, 1962, for a Record Changer and now Patent No. 3,218,079.

In standard record changers having a spindle extending upwardly from a turntable, a shoulder is provided upon which the record stack rests. This results in shifting the center of gravity of a record to a position offset from the point of support of a record on the shoulder, with the result that a record tends to wobble around on the shoulder and assume a tilted position. This results in the high edge of the tilted record engaging against and likely scratching the playing grooves of a second record being placed on the spindle. This tilting can also occur when a relatively few records are initially placed on the spindle. It is also possible that the lowermost record can be jarred off the shoulder and fall onto the turntable.

Accordingly, an object of this invention is to provide a new and improved method of stacking records on a spindle with means for balancing one or more records in a horizontal position on the spindle shoulder.

Another object of the invention is to provide means for balancing records stacked individually one at a time, rather than loading a whole stack at once, with each record being balanced horizontally, making it easier to handle the record due to the avoidance of any tendency of a record to wobble or tilt which reduces finger marks on the playing grooves as well as scratches or dirt which would result in surface noise.

A further object of the invention is to provide a record balancing arm which is located in a position to support records during loading of the spindle and which is connected to a component of the changer, such as a record hold-down member, for movement to an out-of-the-way position during a record change cycle.

Still another object of the invention is to provide a record balancing arm located to also function as a size sensing member to sense the size of a record during the record change cycle to control the set-down position of the tone arm.

Further objects and advantages will become apparent from the following detailed description taken in connection with the accompanying drawings in which.

Figure 1:
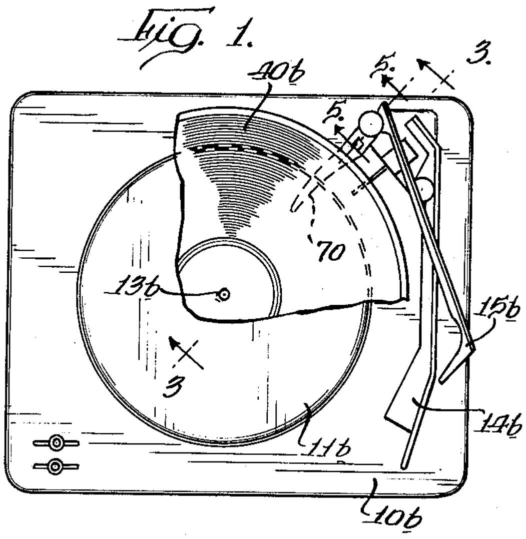
FIG. 1 is a plan view of a record changer embodying a first embodiment of the invention with a record stack broken away.
Figure 2:
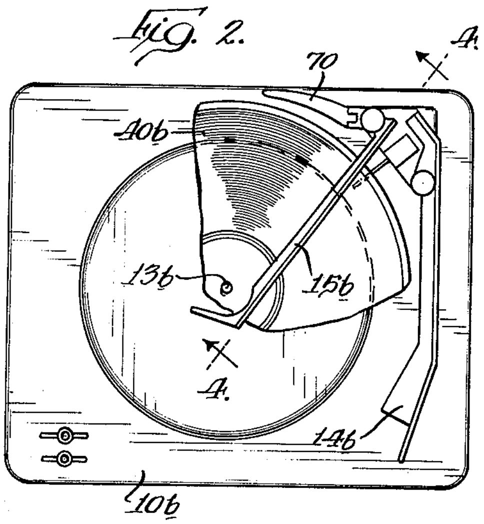
FIG. 2 is a view similar to FIG. 1 with certain components in an alternate position.

While this invention is susceptible of embodiment in many different forms, there is shown in the drawings and will herein be described in detail an embodiment of the invention, together with modifications thereof, with the understanding that the present disclosure is to be considered as an exemplification of the principles of the invention and is not intended to limit the invention to the embodiment illustrated. The scope of the invention will be pointed out in the appended claims.

In the embodiment of FIGS. 1 to 5, a record changer has a motorboard **10*b* which rotatably mounts a turntable 11*b* by known means with a centrally located stationary spindle 13*b* extending upwardly from the turntable. As is well known in the art, the motorboard movably mounts a tone arm 14*b* and a record hold-down member 15*b*, which is movable to a position to yieldably rest upon the upper side of a stack of records and hold the records on the spindle 13*b*** in a known manner.

The spindle **13*b* is provided with a record stack supporting shoulder or shelf 16*b* upon which the lowermost record of a record stack may rest. Due to the support of a record on the shoulder at one side of the central hole thereof, the center of gravity of the record is offset. This can result in a record moving to a tilted position when one or only a few records are supported on the spindle during loading, and the hold-down member 15*b*** is withdrawn.

In order to prevent this, a record balancing arm 70 is mounted on the motorboard **10*b* at a location facing the non-shouldered side of the spindle 13*b* and extends over the turntable to a position to support ten- or twelve-inch records, and it will be seen that the arm may have additional length to support smaller records, such as seven-inch records. The arm 70 is shown in operative position in FIG. 1 and in an inactive position in FIG. 2. This arm is associated with the record hold-down member 15*b* for rotation therewith about the axis of the mounting shaft for the hold-down member. Specifically, an upstanding support 71 secured to the motorboard movably receives a shaft 72 carrying the hold-down member 15*b* at the upper end thereof. The balance arm 70 is mounted on a collar 73 fitted into the support 71 and is keyed to the hold-down member shaft 72 by means of a pin 74 threaded into the collar 73 for the balance arm 70 which engages in a vertically-extending slot 75 in the shaft 72. The collar 73 is loosely mounted in the support 71 and a relatively light spring 76 extends between the hold-down member 15*b* and the collar to preclude any possibility of the collar moving upwardly with the hold-down member 15*b*. The balance arm 70 and hold-down member 15*b* are arranged at an angle to each other as clearly shown in FIG. 2 and with the record hold-down member in position overlying a stack of records, the balance arm 70 is in an out-of-the-way position to not interfere with dropping of records onto the turntable. During placement of records on the changer or removal, as shown in FIG. 1, the hold-down member 15*b* is moved to an out-of-the-way position which places the balance arm 70 in operative position. When records are being removed from the turntable, the balance arm 70 can pivot upwardly to the broken line position shown in FIG. 5 by the arm being mounted on a pin 77 on the collar 73. A lug 78 on the arm 70** engages the collar to limit the downward swinging movement of the arm.

Figure 3:
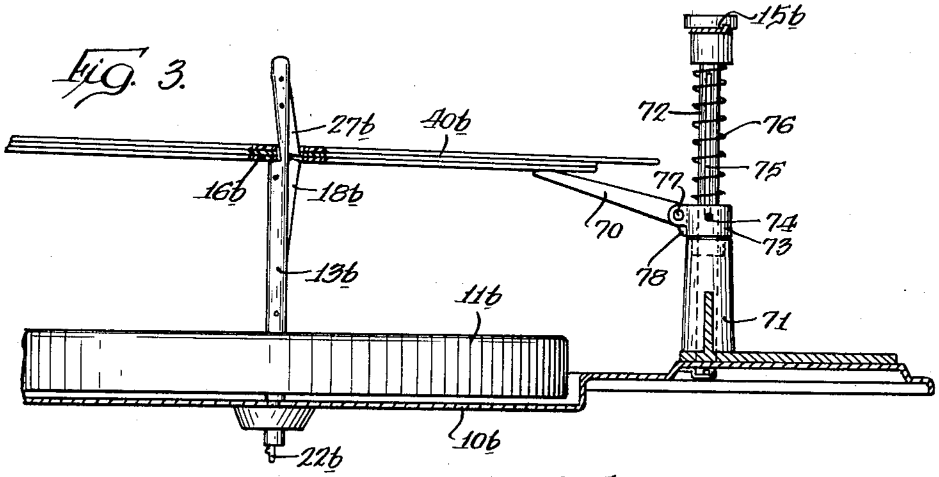
FIG. 3 is a vertical section on an enlarged scale taken generally along the line 3—3 in FIG. 1.
Figure 4:
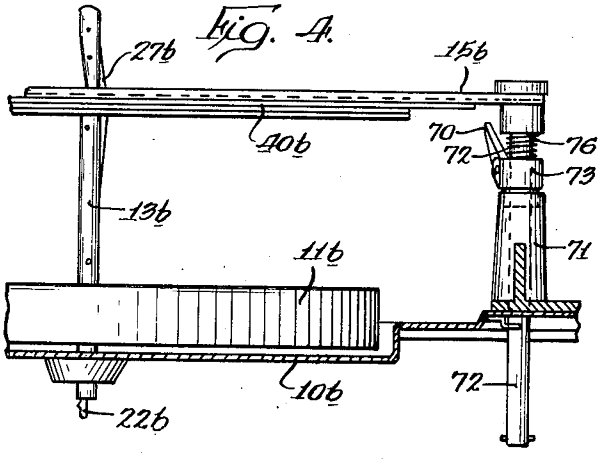
FIG. 4 is a view similar to FIG. 3 showing certain components in a position differing from that of FIG. 3.
Figure 5:
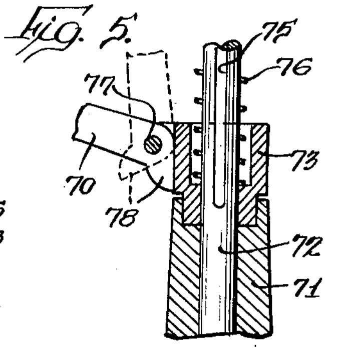
FIG. 5 is a fragmentary vertical section taken generally along the line 5—5 in FIG. 1.

The parts can be held in the position shown in FIGS. 1 and 3 by means of a releasable catch formed by coacting parts on the hold-down member shaft 72 and the member 71. The spring 76 is sufficiently light to permit the hold-down member **15*b* to descend when no records are on the spindle shoulder 16*b***.

Figure 6:
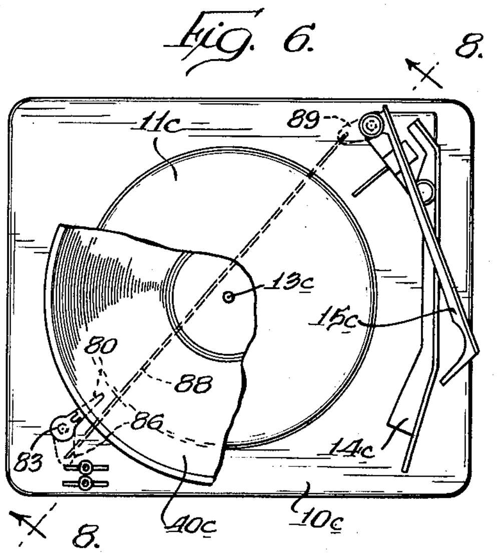
FIG. 6 is a plan view of a record changer embodying another embodiment of the invention with a record stack broken away.
Figure 7:
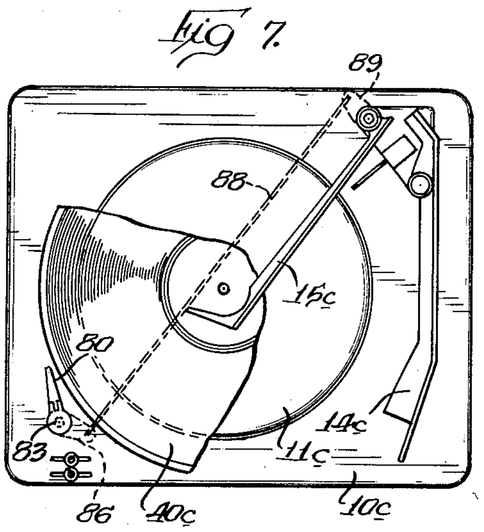
FIG. 7 is a view similar to FIG. 6 showing certain components in an alternate position.
Figure 8:
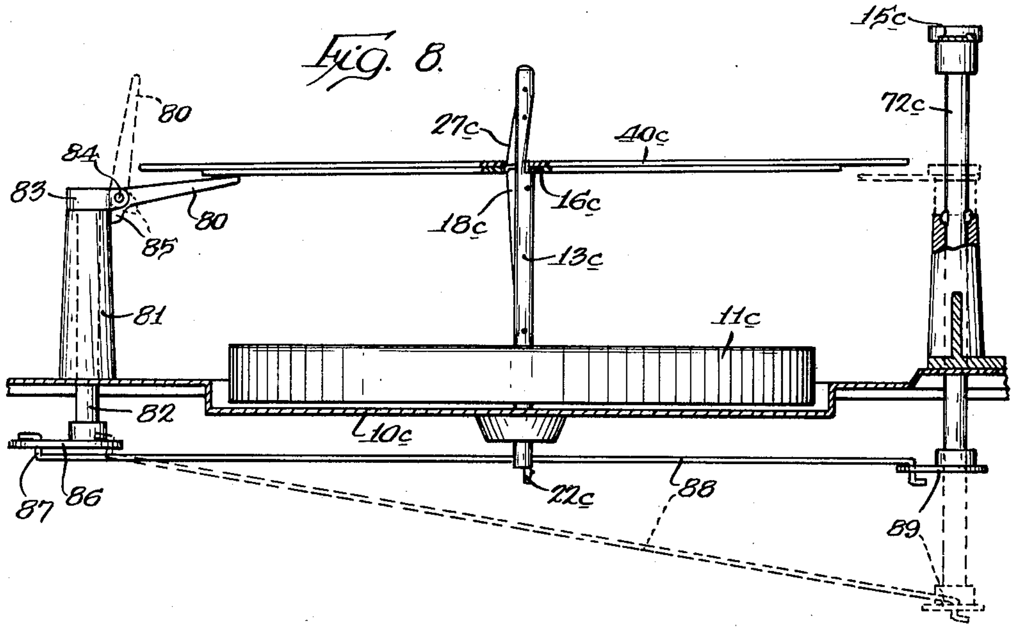
FIG. 8 is a vertical section taken generally along the line 8—8 in FIG. 6.

In the embodiment of FIGS. 6, 7 and 8, similar parts to those shown in the preceding embodiment have been given the same reference numeral with the letter "c" associated therewith.

In this embodiment, a balance arm 80 is supported from the motorboard and again faces the non-shouldered side of the spindle 13c to counteract the tendency of records to tilt. In this embodiment, the shoulder 16c faces the record hold-down member 15c and thus the balance arm 80 is located at a side of the turntable opposite from the hold-down member. Movement of the hold-down member between an operative position, shown in FIG. 6, and an inoperative position, shown in FIG. 7, is derived from movements of the record hold-down member 15c in a manner more fully set forth hereinafter.

A support 81 affixed to the motorboard 10c rotatably mounts a shaft 82 carrying a cap 83 at its upper end having a pin 84 to which the balance arm 80 is pivoted. A lug 85 on the arm engages the support 81 to limit downward movement of the arm while permitting free upward movement of the arm to withdraw a stack of records from the turntable 11c. The lower end of the shaft 82 has a plate 86 with an enlarged opening receiving an end 87 of a link 88 extending across beneath the motorboard to engage in an opening in a plate 89 secured to the lower end of the shaft 72c rotatably mounting the record hold-down member 15c. With this construction, as the record hold-down member 15c is moved to a position to rest upon the top of a stack of records, the balance arm 80 is moved to an out-of-the-way position, as shown in FIG. 7, and when the hold-down member 15c is moved to an inoperative position, the balance arm 80 is moved to an operative position shown in FIG. 6.

Since normally the hold-down member 15c is utilized to detect the absence of further records supported on the spindle shoulder 16c by a further downward movement thereof as shown in broken line in FIG. 8, the connection of the link 88 to the opening in the plate 86 associated with the balance arm 80 is made relatively loose to permit a slightly greater effective length for the link when the hold-down member has descended to signal no more records on the spindle.

With the constructions disclosed herein, it will be seen that a balance arm has been provided to assist in placing one or relatively few records on a spindle shoulder, without resultant tilting of the records, which has frequently resulted in records falling to the turntable or such tilted records interfering with subsequent records placed on the spindle. In each instance, the balancing member is an arm which engages under a record to substantially prevent the tilting and which does not interfere with movement of a record from the spindle shoulder to the turntable or removal of one or more records from the turntable.

I claim:

1. In a record changer, a motorboard, a turntable rotatably supported on the motorboard, a record spindle extending centrally from the turntable, a shoulder on said spindle at a distance from the turntable for supporting a stack of records with the center of gravity of a record on the shoulder offset from the axis of the spindle, a record hold-down member mounted on the motorboard for movement into and out of a position resting upon a stack of records, and means mounted for movement with said hold-down member into a position for supporting a record placed on the shoulder to prevent tilting thereof when said hold-down member moves out of said position resting upon the stack of records.

2. In a record changer, a motorboard, a turntable rotatably supported on the motorboard, a record spindle extending centrally from the turntable, a shoulder on said spindle at a distance from the turntable for supporting a stack of records with the center of gravity of a record on the shoulder offset from the axis of the spindle, a record hold-down member for resting upon a stack of records, a balance member extending over the turntable to a position of support for a record on the shoulder, and means interconnecting said hold-down member and balance member whereby movement of the hold-down member to an operative position moves the balance member to said non-supporting position.

3. In a record changer as defined in claim 2, including means mounting said balance member for free pivoting movement by engagement of a record stack therewith upon removal of the stack from the turntable.

4. In a record changer as defined in claim 2 in which said hold-down member and balance member are at opposite sides of the turntable, and a motion transmitting connection therebetween.

5. In a record changer, a motorboard, a turntable rotatably supported on the motorboard, a record spindle extending centrally from the turntable, a shoulder on said spindle at a distance from the turntable for supporting a stack of records with the center of gravity of a record on the shoulder offset from the axis of the spindle, a record hold-down member pivotally mounted on the motorboard, a balance member associated with the record hold-down member to engage under a record at a location facing the non-shouldered side of the spindle to prevent tilting of the record, and means interconnecting said hold-down member and balance member whereby placement of the record hold-down member over a record moves the balance member away from record engaging position.

6. In a record changer as defined in claim 5, means pivotally mounting the balance member for upward movement by a record stack as the stack is picked up from the turntable after playing thereof.

7. In a record changer as defined in claim 6, said hold-down member and balance member extending at an angle to each other and being pivotally mounted for movement about a common axis, and said interconnecting means embodying a slidable connection whereby the members pivot together between a first position with the hold-down inoperative and the balance member operative and a second position with the hold-down operative and the balance member inoperative while permitting independent axial movement of the hold-down member.

8. In a record changer as defined in claim 6, said hold-down member and balance member being at opposite sides of the turntable with the balance member facing the non-shouldered side of the spindle, and said interconnecting means embodying a link between the two members extending beneath the motorboard whereby the members pivot together between a first position with the hold-down inoperative and the balance member operative and a second position with the hold-down operative and the balance member inoperative while permitting independent axial movement of the hold-down member.

References Cited by the Examiner

UNITED STATES PATENTS 2,637,558 5/1953 Fisher ---------------- 274—10

NORTON ANSHER, *Primary Examiner.*

C. B. PRICE, *Assistant Examiner.*